United States Patent [19]

Matsuo et al.

[11] Patent Number: 5,162,945
[45] Date of Patent: Nov. 10, 1992

[54] OCULAR LENS SYSTEM

[75] Inventors: Hirofumi Matsuo; Hiroyuki Kato, both of Tokyo, Japan

[73] Assignee: Asahi Kogaku Kogyo K.K., Tokyo, Japan

[21] Appl. No.: 544,721

[22] Filed: Jun. 27, 1990

[30] Foreign Application Priority Data

| Jun. 27, 1989 | [JP] | Japan | 1-165096 |
| Jun. 27, 1989 | [JP] | Japan | 1-165097 |
| Apr. 20, 1990 | [JP] | Japan | 2-104996 |
| Apr. 20, 1990 | [JP] | Japan | 2-104997 |

[51] Int. Cl.$^5$ .......... G02B 9/06; G02B 9/12; G02B 9/34; G02B 13/18
[52] U.S. Cl. .......... 359/646; 359/644; 359/645; 359/715; 359/716; 359/717
[58] Field of Search .......... 350/410, 414, 454, 432; 359/644, 645, 646, 660, 661, 748, 715, 716, 717

[56] References Cited

U.S. PATENT DOCUMENTS

| 3,862,796 | 1/1975 | De Jager | 350/410 |
| 4,593,984 | 6/1986 | Kimura et al. | 359/646 |
| 4,673,262 | 6/1987 | Tsuji | 350/410 |

FOREIGN PATENT DOCUMENTS

| 51-120231 | 10/1976 | Japan . |
| 54-44457 | 12/1979 | Japan . |
| 54-44458 | 12/1979 | Japan . |
| 60-48014 | 10/1985 | Japan . |
| 60-227215 | 11/1985 | Japan . |
| 61-48810 | 3/1986 | Japan . |
| 61-285418 | 12/1986 | Japan . |
| 62-280710 | 12/1987 | Japan . |
| 63-6851 | 2/1988 | Japan . |
| 63-318514 | 12/1988 | Japan . |

Primary Examiner—Scott J. Sugarman
Attorney, Agent, or Firm—Sughrue, Mion, Zinn, Macpeak & Seas

[57] ABSTRACT

An ocular system is disclosed which is composed of at least three lens elements for constituting, in order from the eye side, at least first and second lens units. At least one of the lens elements is made of resin. Two of the lens elements are substantially cemented together. In addition, an aspherical plastic lens is effectively used in the system.

42 Claims, 15 Drawing Sheets

OCULAR LENS SYSTEM

BACKGROUND OF THE INVENTION

The present invention relates to an ocular lens for binoculars, astronomical telescopes and the like, which may be made in low cost with a wide viewing angle.

The following three-element types of ocular lens systems for binoculars or the like are known;

i) A three-lens element system for an ocular lens for binoculars (for example, Japanese Patent Unexamined Publication No. 51-120231);

ii) A three-unit and three-element system for an ocular lens for viewfinders, which uses a plastic material as an optical material with an aspherical surface (for example, Japanese Patent Unexamined Publication Nos. 60-227215 and 63-318514); and iii) A two-unit and three-element system for a viewfinder ocular system, which uses only optical glass for lens elements (for example, Japanese Patent Unexamined Publication No. 61-48810).

However, the foregoing systems suffer from the following disadvantages:

The ocular system i) suffers from a disadvantage that a curvature of field, an astigmatism and the like could not sufficiently be compensated for in a wide viewing angle. The ocular system ii) suffers from a disadvantage that it would be difficult to compensate for aberrations in a wide viewing angle due to the generation of the transversal chromatic aberration and the like although the curvature of field would be small. Also, the ocular system ii) and iii) have a small viewing angle. It should be also noted that any of the systems i) to iii) could not be manufactured at a low cost.

On the other hand, there have been proposed ocular systems each of which includes four to six lens elements in order to carry out a good aberration compensation covering a marginal portion of the view field (see Japanese Patent Examined Publication Nos. 63-6851 and 60-48014).

However, in the types having four or more lens elements, there is a serious problem that the manufacturing cost therefor becomes increased and a physical size would be increased. In order to perform a satisfactory aberration compensation with the ocular system which consists of four lens elements, it is necessary that an optical glass having a high refractive index be used for each lens and a radius of curvature be shortened. As a result, it is difficult to carry out the machining so that the manufacturing cost is increased. In particular, it is very difficult to make an aspherical surface on a glass lens, resulting in increase of manufacturing cost. In order to cope with these problems, it is proposed to use a plastic lens element. However, in general, the refractive index of the plastic is low so that it would be difficult to fully compensate for the aberration, particularly, coma aberration and spherical aberration.

SUMMARY OF THE INVENTION

Accordingly, in view of the foregoing disadvantages inherent in the prior art, an object of the invention is to provide an ocular lens system which may be manufactured at low cost, and in which a satisfactory aberration compensation is effected even in a wide viewing field of 50° to 60° in appearance.

In order to meet this object, according to the present invention, there is provided a two-unit and three-element ocular system which is composed, in order from the eye side, of a positive first lens unit and a positive second lens unit, the first lens unit consisting of a single positive lens element, the second lens unit consisting of a cemented lens composed of a positive lens element and a negative lens element or of a negative lens element and a positive lens element, and at least one of the three lens elements being made of optical material of resin.

The above-specified ocular lens system, preferably, meets the following conditions:

$$|r_4/r_n| < 0.47 \quad (1)$$

$$0.10 < f/f_{II} < 0.65 \quad (2)$$

where $r_4$ is the radius of curvature of the bonded surface of the second lens unit, $r_n$ is the radius of cuvature of the surface other than the bonded surface of the negative lens element of the second lens unit, f is the overall focal length, and $f_{II}$ is the focal length of the second lens unit.

It is more preferable to provide an aspherical surface, given by the following condition, to the ocular lens system in order to compensate for the curvature of field and astigmatism.

$$X = \frac{Cy^2}{1 + \sqrt{1 - (K+1)C^2y^2}} + A_4y^4 + A_6y^6 \ldots$$

where X is an amount of deviation from an apex of a lens in the axial direction, y is an amount of deviation from the apex of the lens in a vertical direction relative to the axial direction, C is the inverted number of the radius of curvature, K is a conical constant, and $A_4$, $A_6$, ... are the aspherical suface coefficients.

The following conditions should be met in order to facilitate the manufacturing of the ocular lens at low cost.

$$|r_p/r_n| < 1.55 \quad (3)$$

$$\overline{n} < 1.60 \quad (4)$$

where $r_p$ is the radius of curvature other than the bonded surface of the positive lens element of the second lens unit, and $\overline{n}$ is the average value of the refractive indexes of the three lens elements on d-line.

Furthermore, in order to keep the various aberrations at reasonable values, the following condition should be met.

$$-1.70 < r_2/r_1 \leq 0 \quad (5)$$

where $r_1$ and $r_2$ are the radii of curvature of the surfaces, on the eye side and the image side, of the first lens unit.

According to the present invention, since the resinous optical material is used for at least one of the lens elements of the two-unit and three-element system, it is possible to manufacture the system at low cost.

According to another aspect of the present invention, there is provided an ocular optical system which is composed, in order from the eye side, of a positive first lens element, a negative meniscus second lens element, a positive third lens element and a negative fourth lens element. The first and second lens elements are made of optical glass or resinous optical material, and the third and fourth lens elements are made of resinous optical material. At least one of the lens surfaces is preferably made as an aspherical surface as described before.

In the ocular system including four lens elements, the average refractive index condition (4) should also be met. In addition, the following condition should be met.

$$-4.0 < f_4/f < -0.5 \qquad (6)$$

where $f_4$ is the focal length of the fourth lens element.

According to the present invention, the resinous optical material is used for the ocular lens system so that it is easy to machine the resinous material, which is beneficial for mass-production. In addition, the present invention compensates for the various aberrations without increasing the number of the lens elements.

DETAILED DESCRIPTION OF THE PREFERRED EMBODIMENTS

Figure 1:
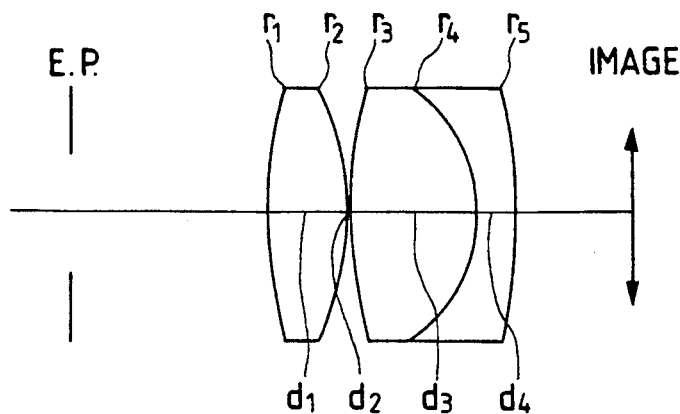
FIG. 1 is a cross-sectional view showing a first example of an ocular lens system according to the invention.
Figure 2:
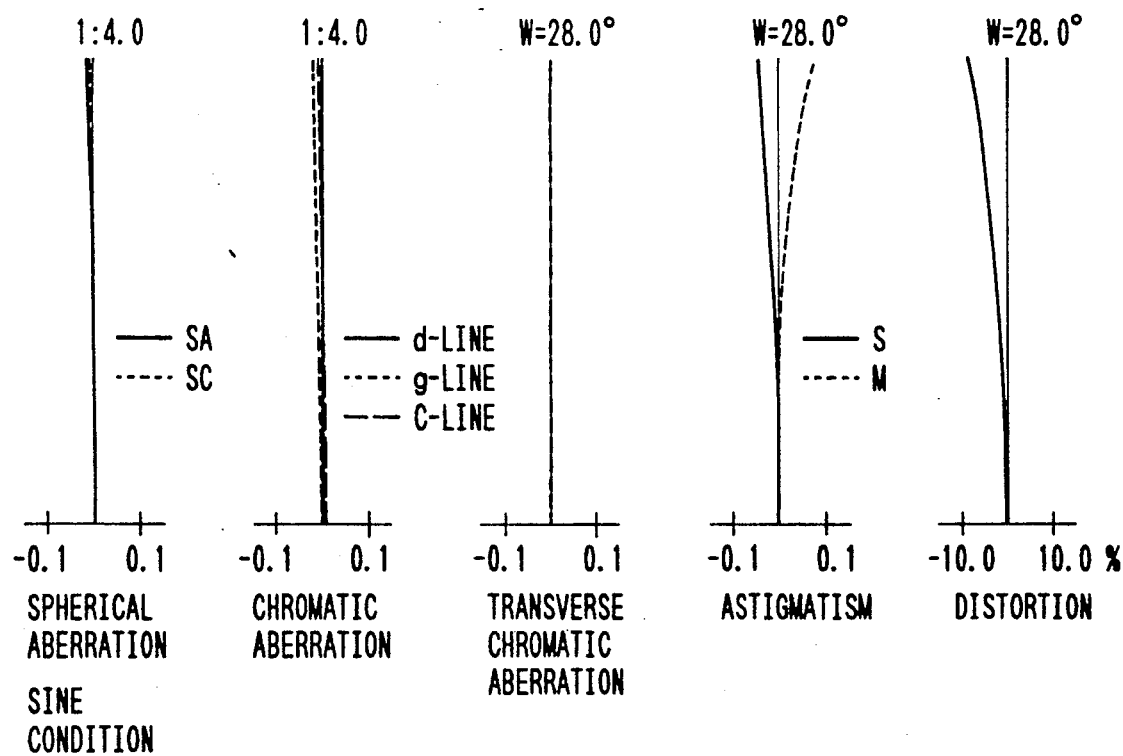
FIG. 2 is a plurality of graphs showing various aberrations generated in the first example.
Figure 3:
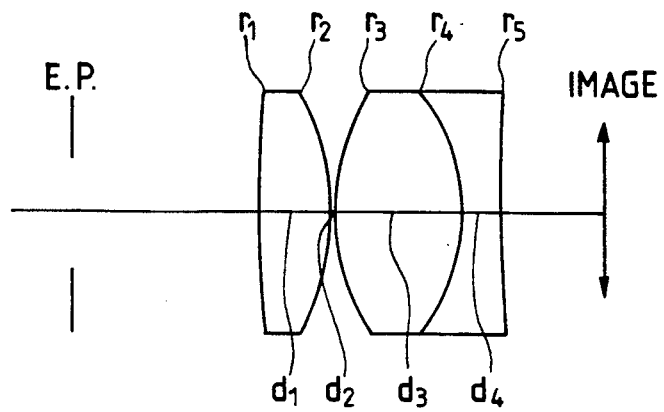
FIG. 3 is a cross-sectional view showing a second example of an ocular lens system according to the invention.
Figure 4:
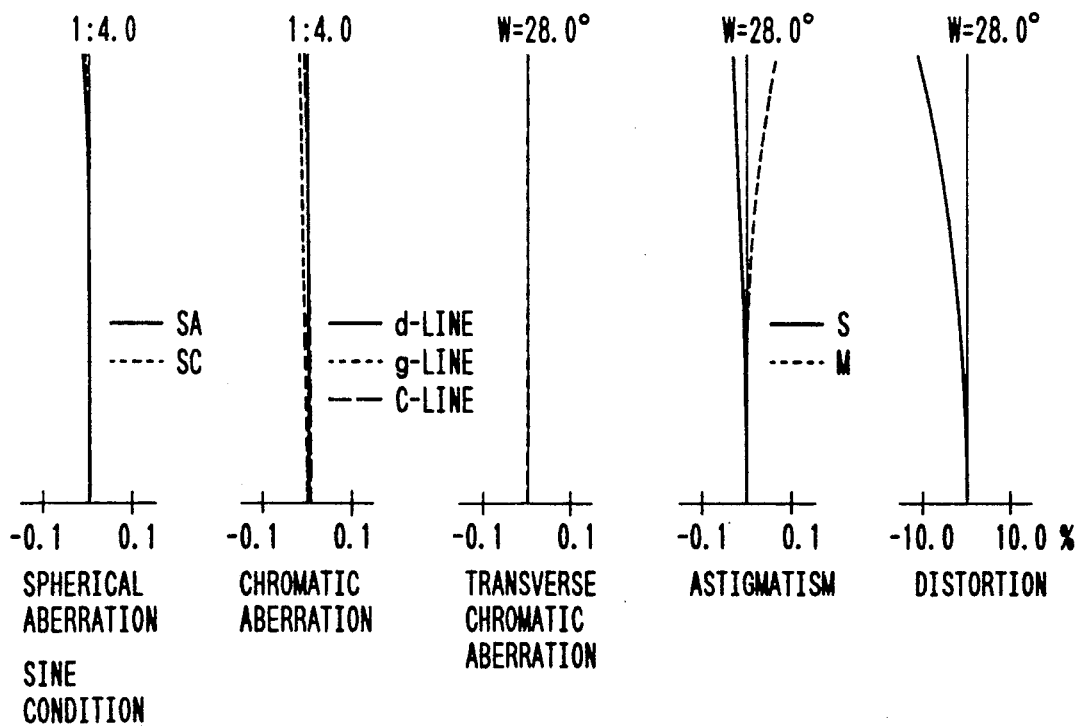
FIG. 4 is a plurality of graphs showing various aberrations generated in the second example.
Figure 5:
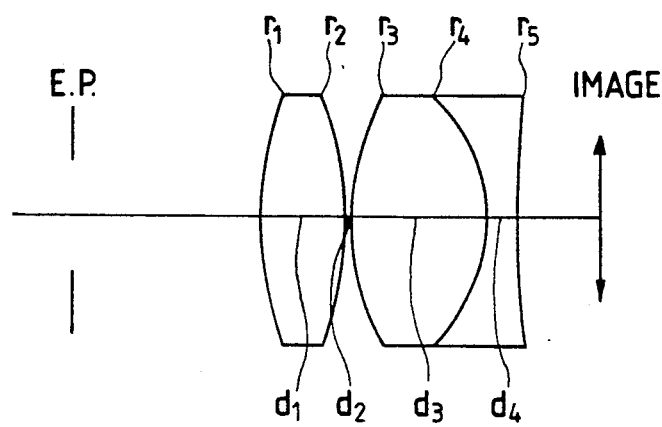
FIG. 5 is a cross-sectional view showing a third example of an ocular lens system according to the invention.
Figure 6:
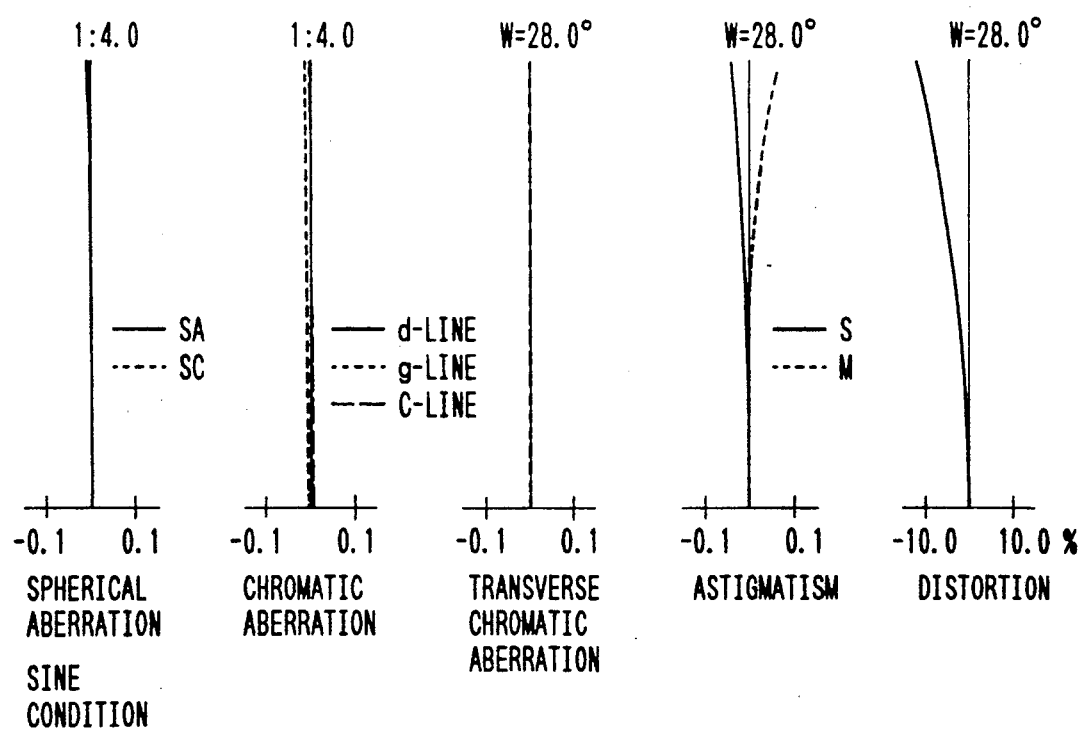
FIG. 6 is a plurality of graphs showing various aberrations generated in the third example.
Figure 7:
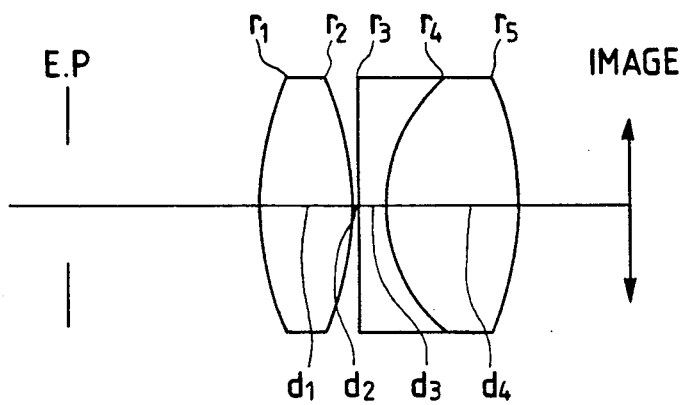
FIG. 7 is a cross-sectional view showing a fourth example of an ocular lens system according to the invention.
Figure 8:
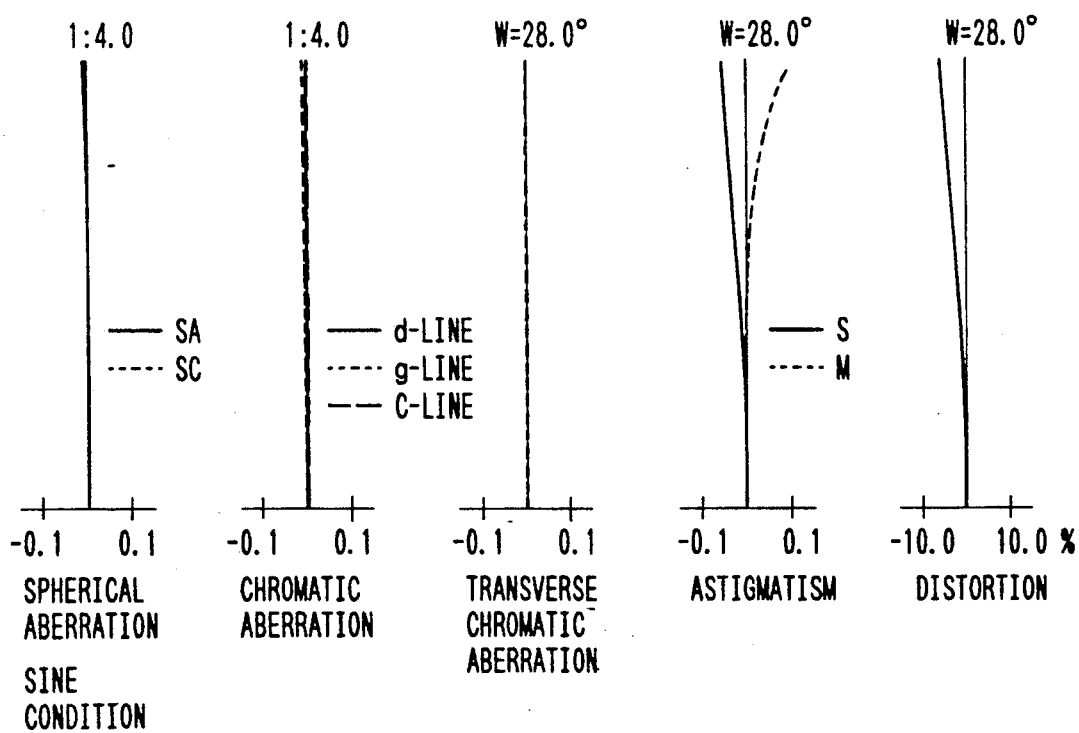
FIG. 8 is a plurality of graphs showing various aberrations generated in the fourth example.
Figure 9:
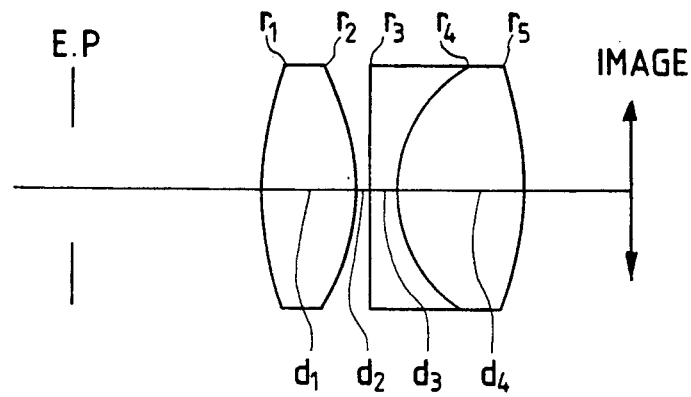
FIG. 9 is a cross-sectional view showing a fifth example of an ocular lens system according to the invention.
Figure 10:
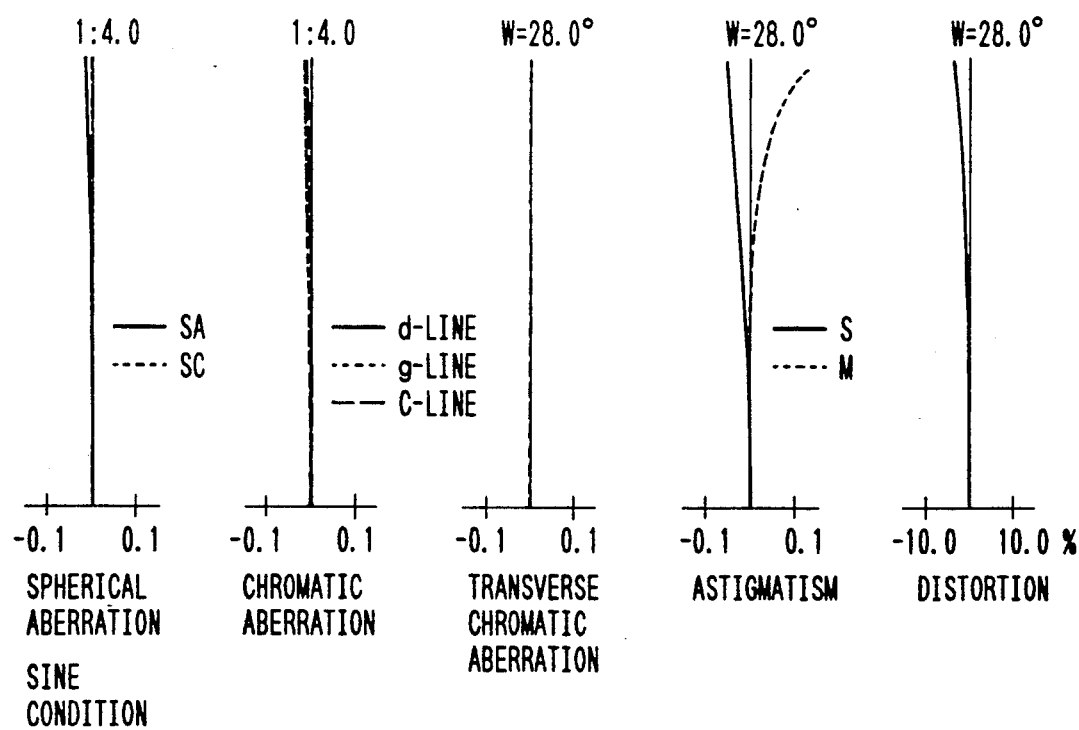
FIG. 10 is a plurality of graphs showing various aberrations generated in the fifth example.
Figure 11:
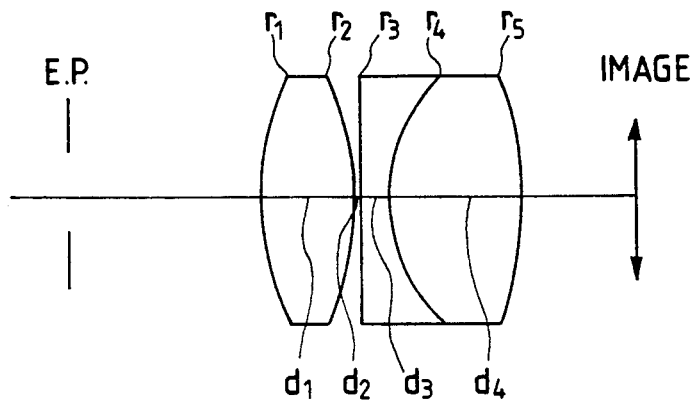
FIG. 11 is a cross-sectional view showing a sixth example of an ocular lens system according to the invention.
Figure 12:
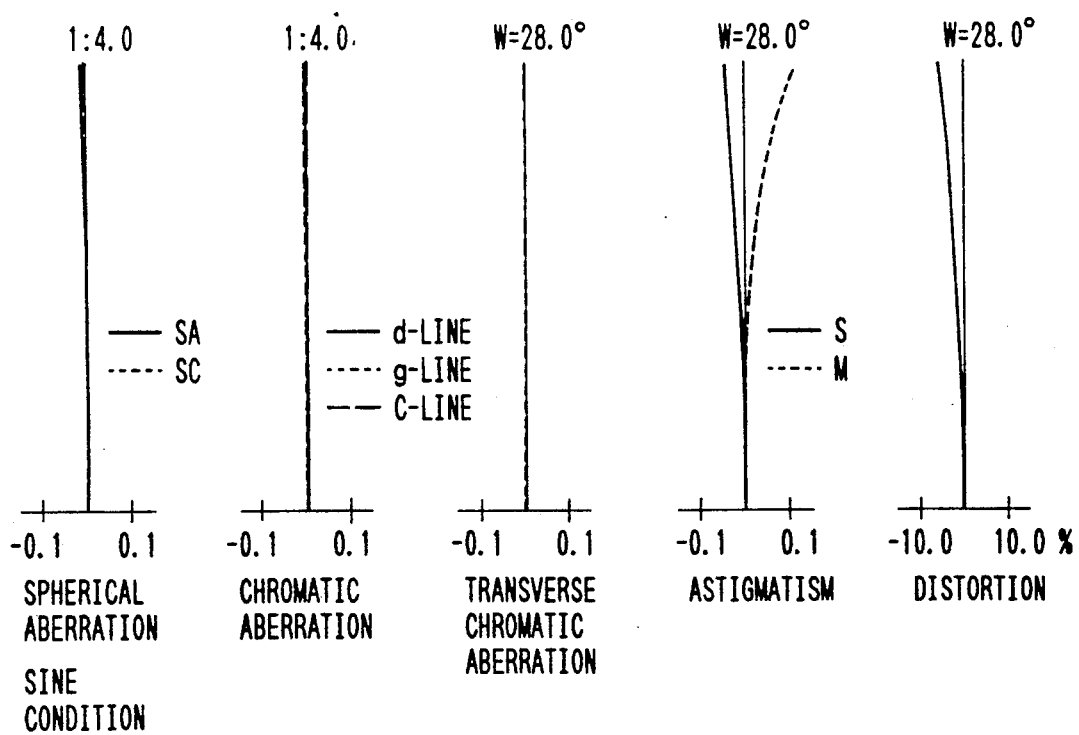
FIG. 12 is a plurality of graphs showing various aberrations generated in the sixth example.
Figure 13:
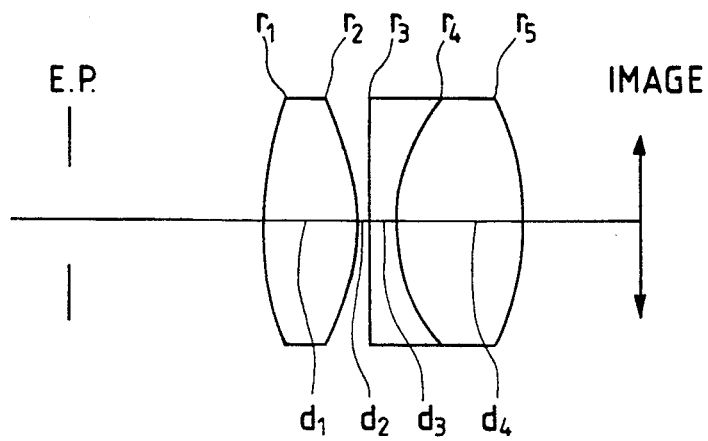
FIG. 13 is a cross-sectional view showing a seventh example of an ocular lens system according to the invention.
Figure 14:
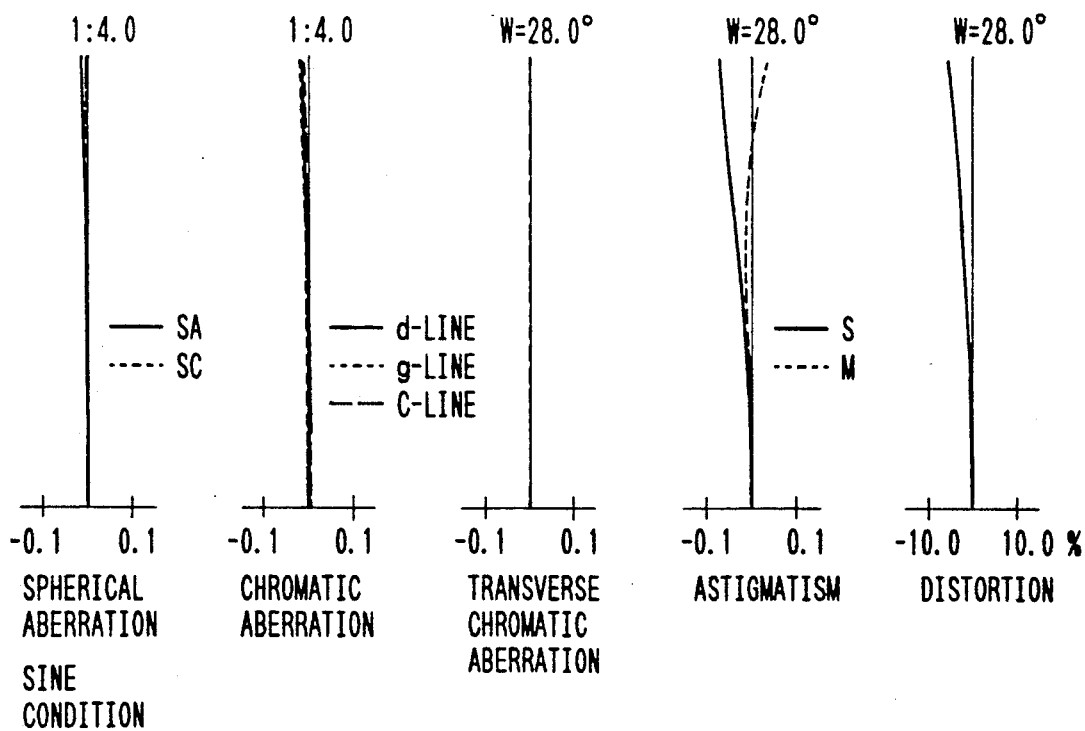
FIG. 14 is a plurality of graphs showing various aberrations generated in the seventh example.
Figure 15:
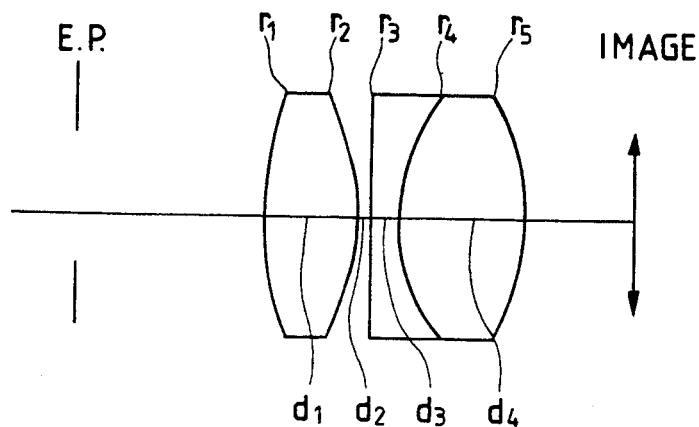
FIG. 15 is a cross-sectional view showing a eighth example of an ocular lens system according to the invention.
Figure 16:
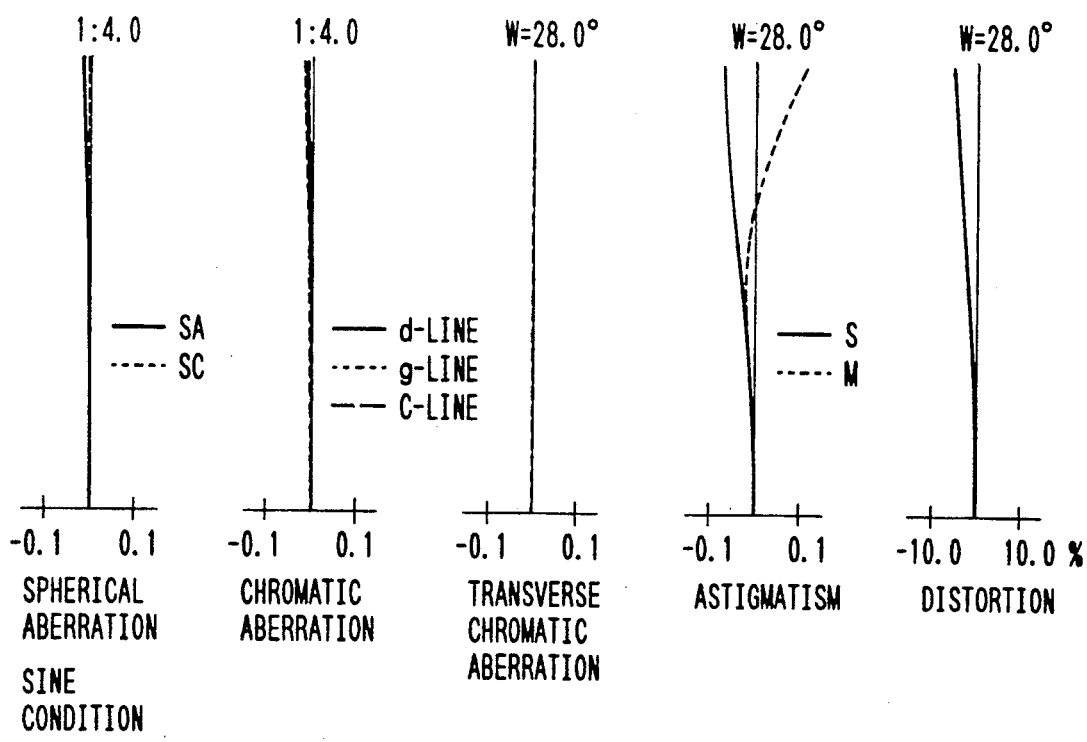
FIG. 16 is a plurality of graphs showing various aberrations generated in the eighth example.
Figure 17:
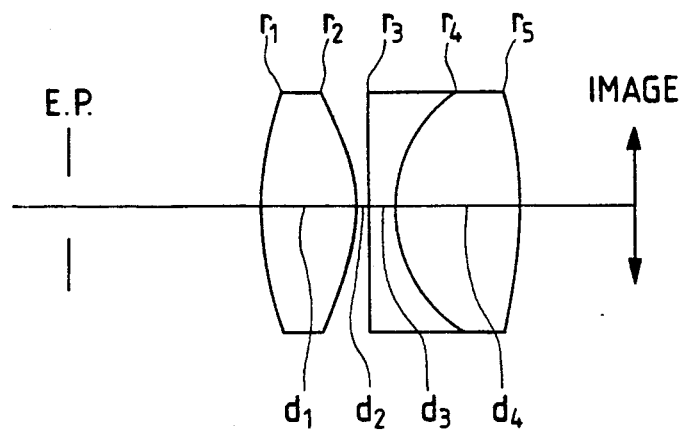
FIG. 17 is a cross-sectional view showing a ninth example of an ocular lens system according to the invention.
Figure 18:
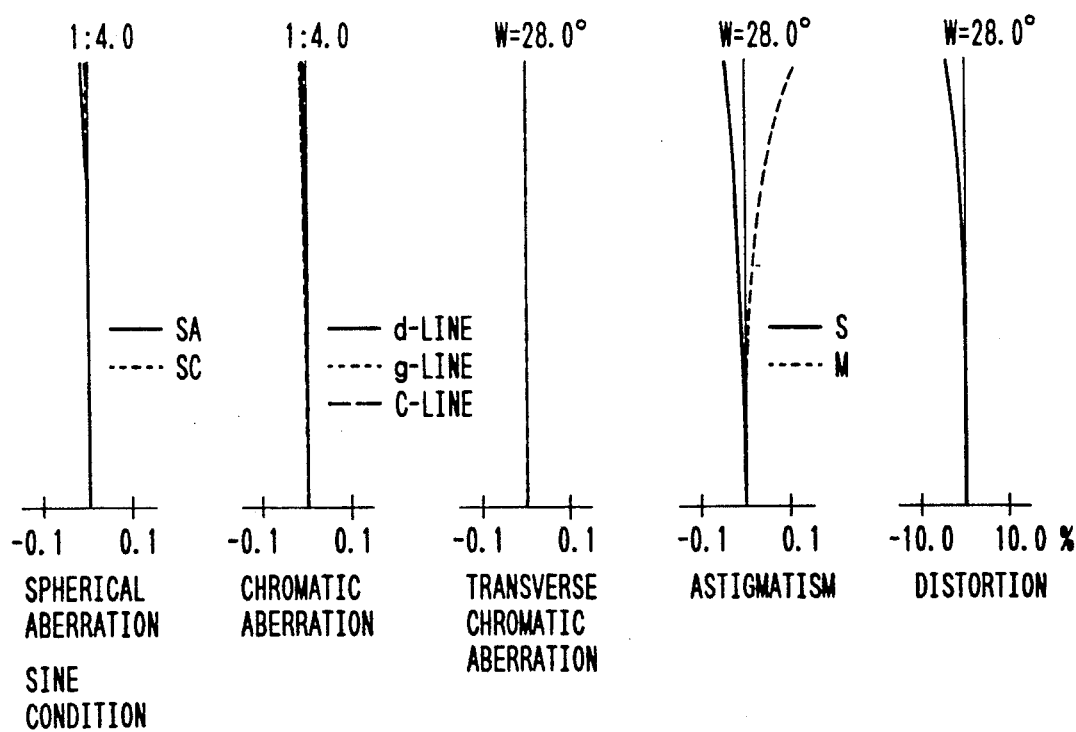
FIG. 18 is a plurality of graphs showing various aberrations generated in the ninth example.
Figure 19:
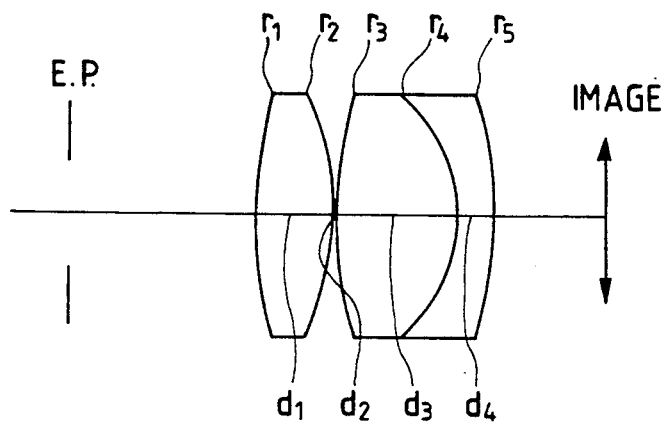
FIG. 19 is a cross-sectional view showing a tenth example of an ocular lens system according to the invention.
Figure 20:
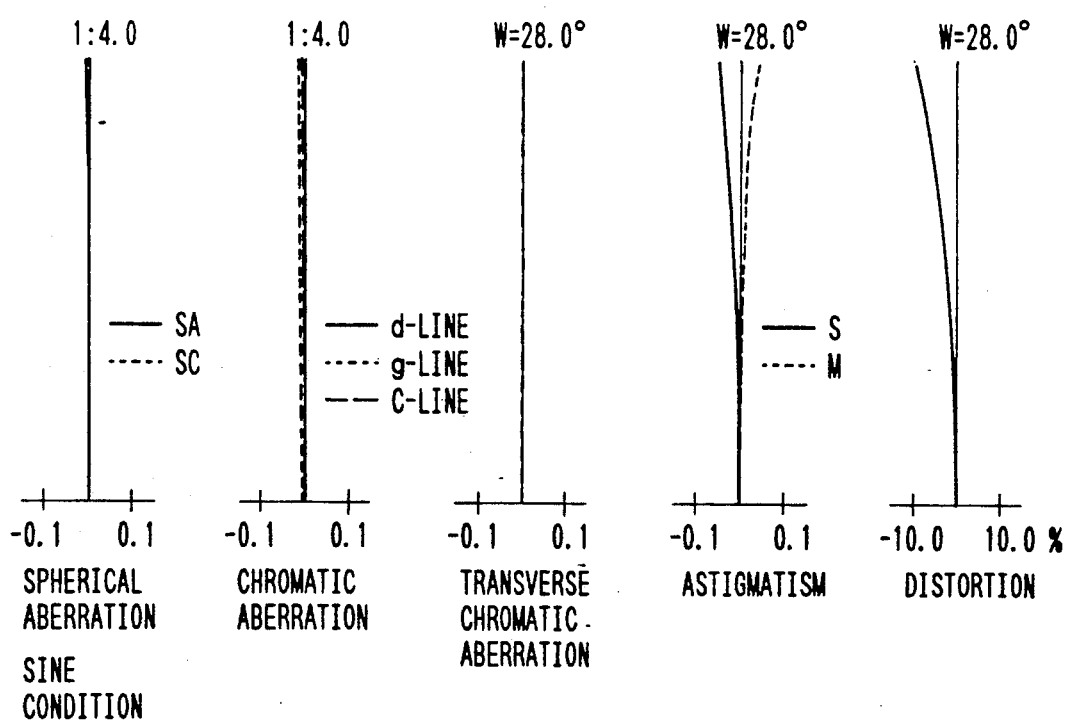
FIG. 20 is a plurality of graphs showing various aberrations generated in the tenth example.
Figure 21:
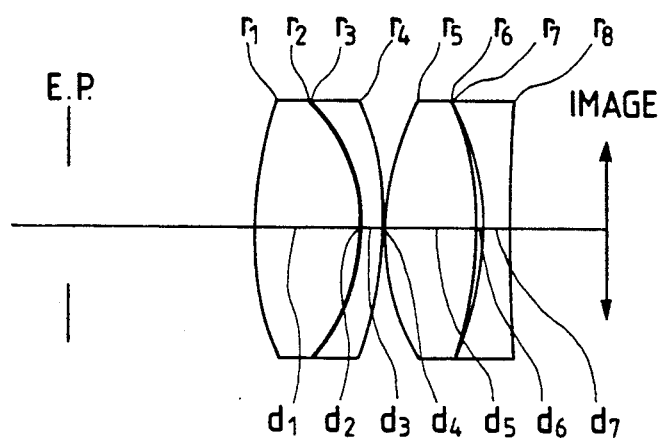
FIG. 21 is a cross-sectional view showing a eleventh example of an ocular lens system according to the invention.
Figure 22:
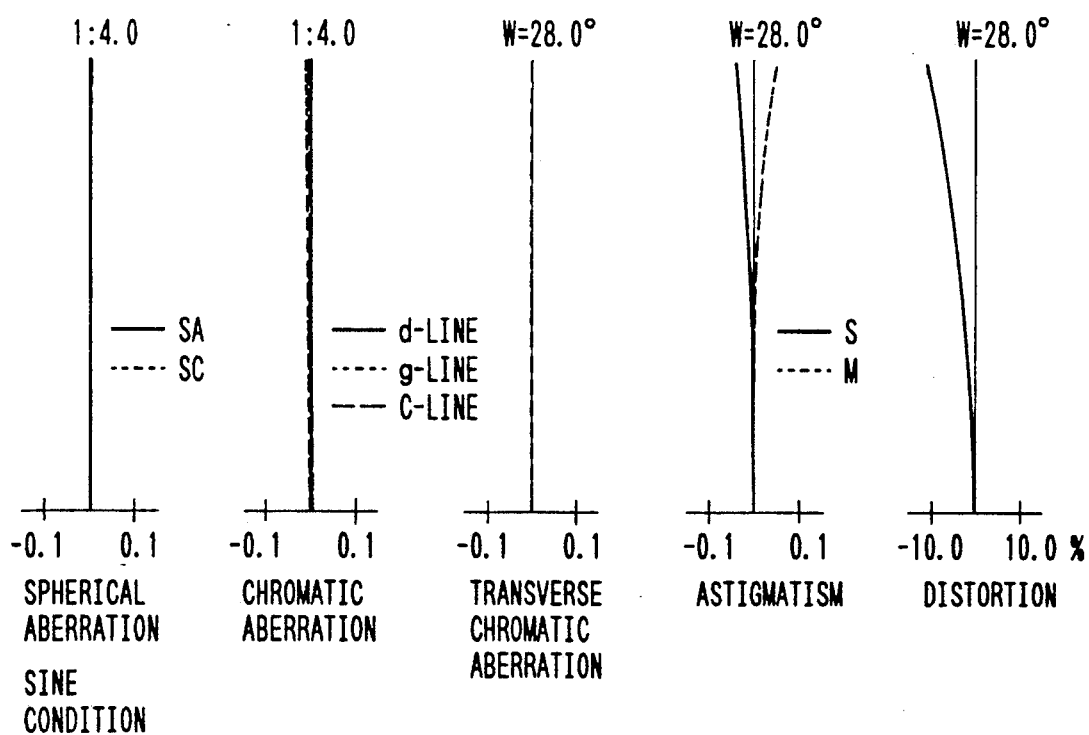
FIG. 22 is a plurality of graphs showing various aberrations generated in the tenth example.
Figure 23:
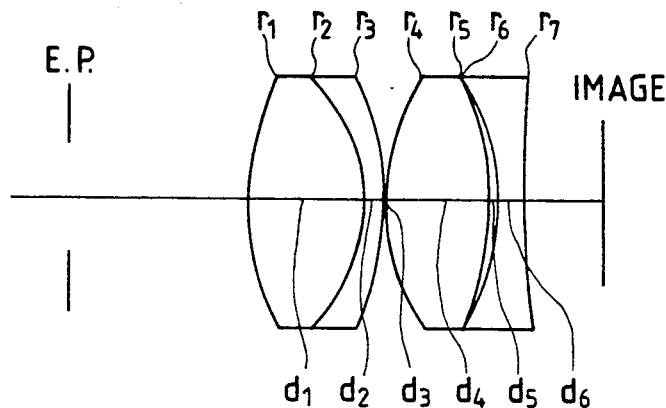
FIG. 23 is a cross-sectional view showing a twelfth example of an ocular lens system according to the invention.
Figure 24:
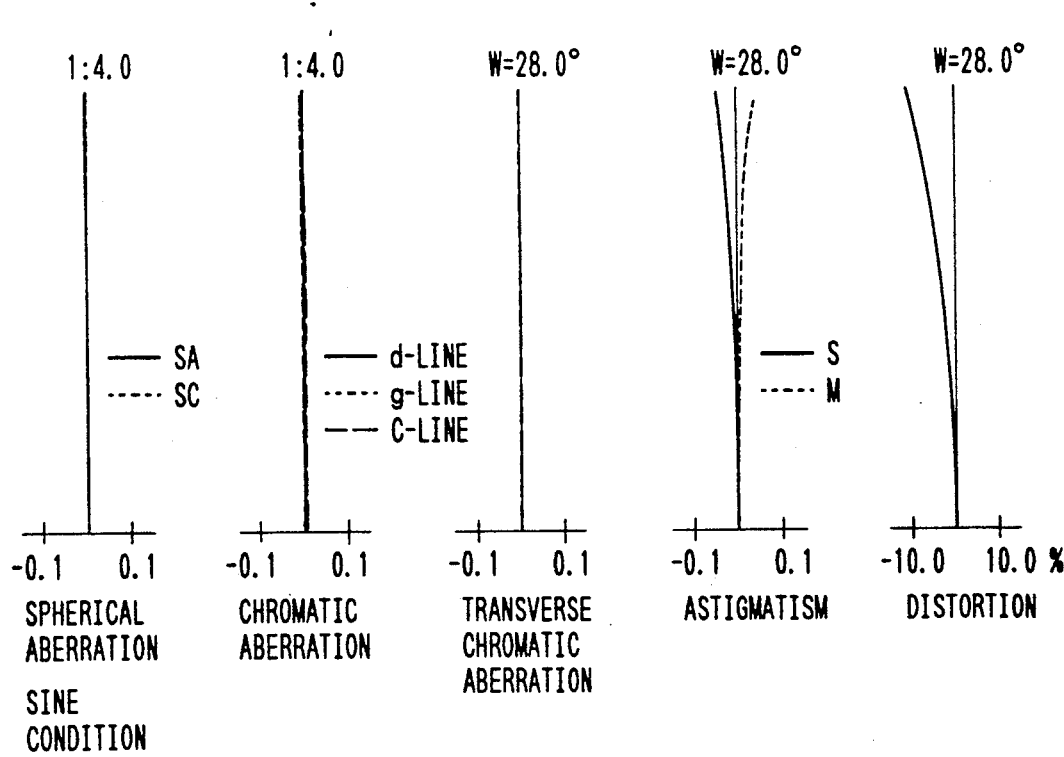
FIG. 24 is a plurality of graphs showing various aberrations generated in the twelfth example.
Figure 25:
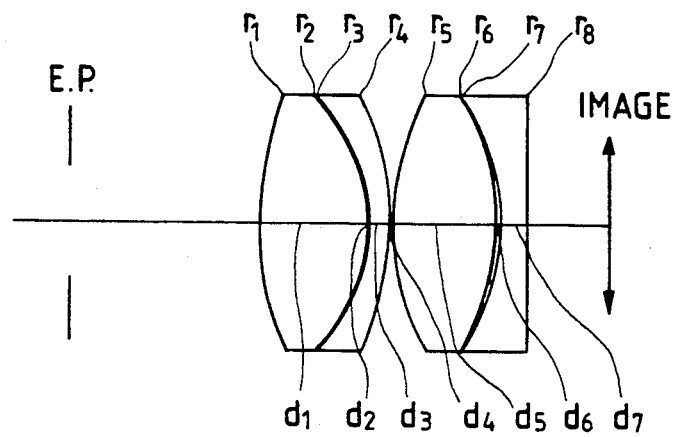
FIG. 25 is a cross-sectional view showing a thirteenth example of an ocular lens system according to the invention.
Figure 26:
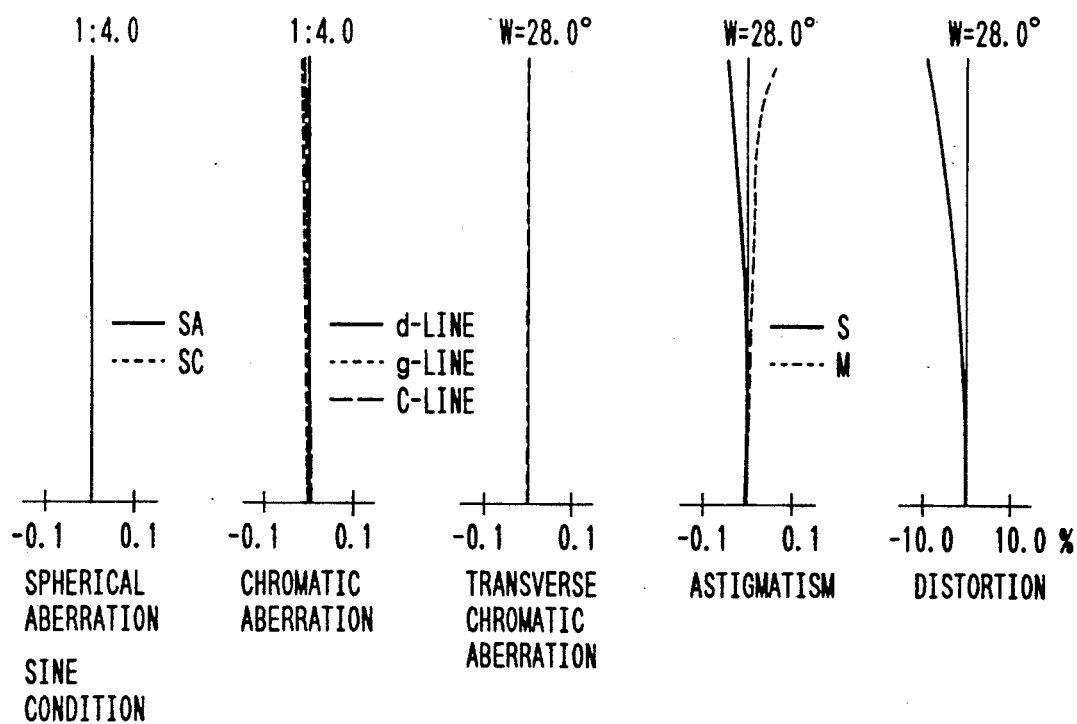
FIG. 26 is a plurality of graphs showing various aberrations generated in the thirteenth example.
Figure 27:
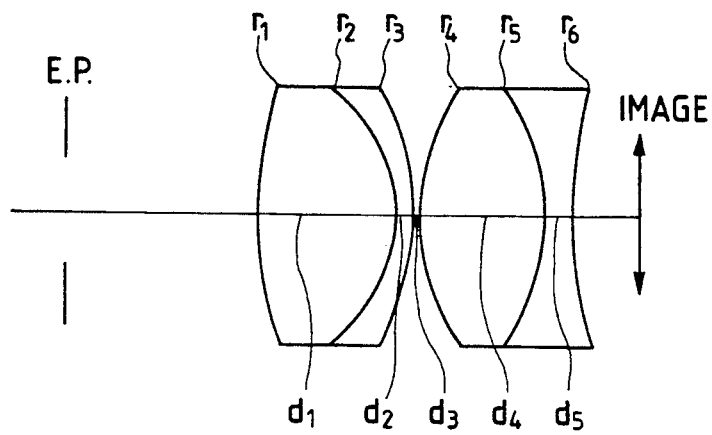
FIG. 27 is a cross-sectional view showing a fourteenth example of an ocular lens system according to the invention.
Figure 28:
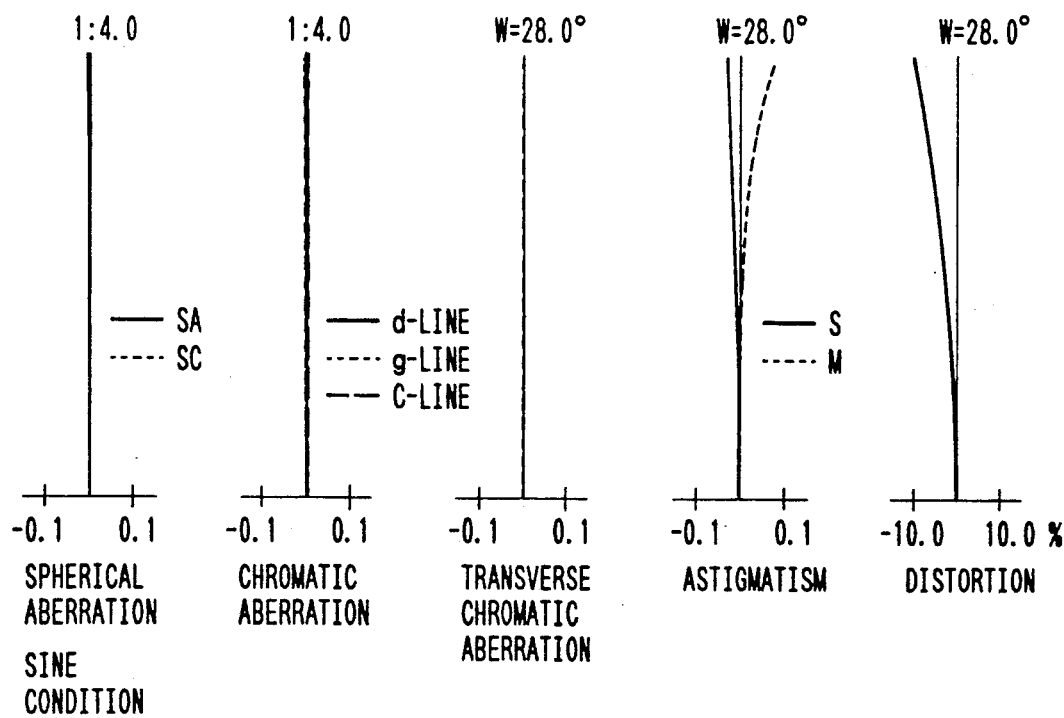
FIG. 28 is a plurality of graphs showing various aberrations generated in the fourteenth example.
Figure 29:
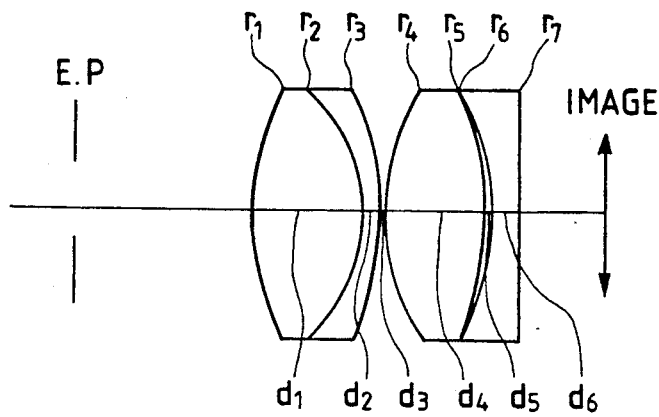
FIG. 29 is a cross-sectional view showing a fifteenth example of an ocular lens system according to the invention.
Figure 30:
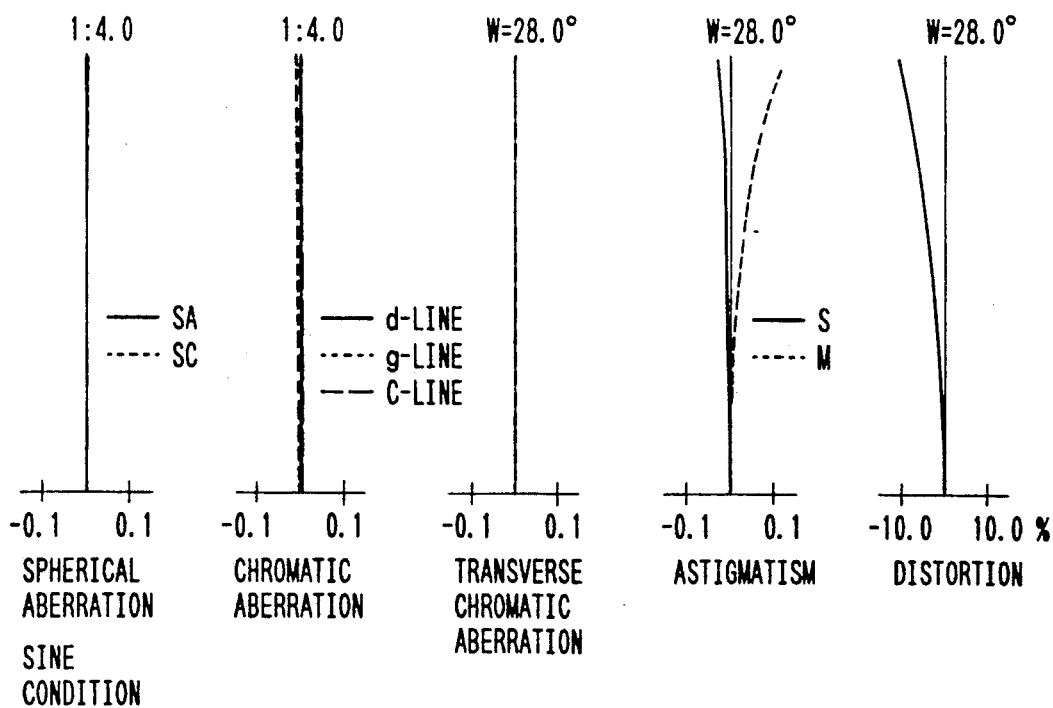
FIG. 30 is a plurality of graphs showing various aberrations generated in the fifteenth example.

The condition (1) defined the radius of curvature of the bonded surface. If the upper limit of the condition (1) were exceeded, the radius of curvature of the bonded surface of the second lens unit would be increased. As a result, it would be difficult to compensate for transversal chromatic aberration.

The condition (2) relates to the focal length of the second lens unit. If the upper limit of the second condition (2) were increased, a refractive power of the second lens unit would be too large. As a result, the Petzval's sum would be increased so that the compensation of astigmatism would be unsatisfactory. If the lower limit were exceeded, the spherical aberration and the coma aberration would be generated.

It is also important to provide the aspherical surface to at least one surface in order to correct the transversal chromatic aberration and astigmatism. With the aspherical surface, it is possible to ensure an image surface stable up to a wide viewing angle.

The condition (3) defined the radius of curvature, other than the bonded surface, of the second lens unit. If the upper limit of the condition (3) were exceeded, the radius of curvature of the second lens unit would be shortened, and it would be difficult to meet the requirement of condition (1).

The condition (4) defined the average value of refractive indexes of the respective lens elements. As specified in this condition, the optical material having a low refractive index should be used to reduce the manufacturing cost.

In addition, the condition (5) defined the radii of curvature of the first and second surfaces of the first lens elements. If the upper limit of the condition (5) were exceeded, it is difficult to compensate for the spherical aberration and coma aberration. Inversely, if the lower limit exceeded, the distortion would be insufficiently corrected.

It should be noted that at least one of the lens elements is made of resinous optical material. It is preferable for use the glass material to a lens close to the eye. Namely, since the lens element on the eye side is exposed to the outside, the lens element is likely to be subjected to foreign matter or dust. If the lens is made of glass, then the lens is hard in comparison with the resinous lens. In addition, it is easier to apply a hard coating to the glass lens.

If the upper limit of the condition (6) were exceeded, the refractive power of the fourth lens element would be too large. As a result, the marginal light flux is unlikely to pass through the lens system. thus, it would be difficult to increase the viewing angle. Also, if the lower limit were exceeded, the Petzval's sum would be increased.

EXAMPLES

The specific examples of the present invention will be listed, in which f is the overall focal length, $F_{NO}$ is the F-number, $2\omega$ is the viewing angle, r is the radius of curvature of each lens surface, d is the lens thickness or the interval between the adjacent lenses, $\bar{n}$ is the refractive index of each lens at d-line, and $\nu$ is the Abbe number.

EXAMPLE 1

| Surface No. | $f = 1.0$  $F_{NO} = 1:4.0$  $2\omega = 56°$ | | | |
|---|---|---|---|---|
| | r | d | n | v |
| 1 | 1.901 | 0.340 | 1.51633 | 64.1 |
| 2 | −1.162 | 0.017 | | |
| 3 | 1.675 | 0.531 | 1.492 | 57.4 (resin) |
| 4 | −0.632 | 0.169 | 1.585 | 29.9 (resin) |
| 5 | −2.301 | | | |

| aspherical third surface |
|---|
| K = 5.138 |
| $A_4 = -2.17588 \times 10^{-1}$ |
| $A_6 = -3.22044 \times 10^{-1}$ |
| (1) $|r_4/r_n| = 0.275$ |
| (2) $f/f_{II} = 0.385$ |
| (3) $|r_p/r_n| = 0.728$ |
| (4) $\bar{n} = 1.531$ |
| (5) $r_2/r_1 = -0.611$ |

EXAMPLE 2

| Surface No. | $f = 1.0$  $F_{NO} = 1:4.0$  $2\omega = 56°$ | | | |
|---|---|---|---|---|
| | r | d | n | v |
| 1 | 5.255 | 0.318 | 1.51633 | 64.1 |
| 2 | −1.031 | 0.017 | | |
| 3 | 0.943 | 0.548 | 1.492 | 57.4 (resin) |
| 4 | −0.842 | 0.168 | 1.585 | 29.9 (resin) |
| 5 | 8.573 | | | |

| aspherical third surface |
|---|
| K = 0.414 |
| $A_4 = -1.06217 \times 10^{-1}$ |
| $A_6 = -1.38306 \times 10^{-1}$ |
| (1) $|r_4/r_n| = 0.098$ |
| (2) $f/f_{II} = 0.380$ |
| (3) $|r_p/r_n| = 0.110$ |
| (4) $\bar{n} = 1.531$ |
| (5) $r_2/r_1 = -0.196$ |

EXAMPLE 3

| Surface No. | $f = 1.0$  $F_{NO} = 1:4.0$  $2\omega = 56°$ | | | |
|---|---|---|---|---|
| | r | d | n | v |
| 1 | 1.523 | 0.382 | 1.51633 | 64.1 |
| 2 | −1.433 | 0.017 | | |
| 3 | 1.011 | 0.604 | 1.492 | 57.4 (resin) |
| 4 | −0.752 | 0.126 | 1.585 | 29.9 (resin) |
| 5 | 4.216 | | | |

| aspherical third surface |
|---|
| K = 0.619 |
| $A_4 = -1.05992 \times 10^{-1}$ |
| $A_6 = -3.44424 \times 10^{-1}$ |
| (1) $|r_4/r_n| = 0.178$ |
| (2) $f/f_{II} = 0.279$ |
| (3) $|r_p/r_n| = 0.240$ |
| (4) $\bar{n} = 1.531$ |
| (5) $r_2/r_1 = -0.941$ |

EXAMPLE 4

| Surface No. | $f = 1.0$  $F_{NO} = 1:4.0$  $2\omega = 56°$ | | | |
|---|---|---|---|---|
| | r | d | n | v |
| 1 | 1.276 | 0.415 | 1.51633 | 64.1 |
| 2 | −1.276 | 0.017 | | |
| 3 | 3.212 | 0.126 | 1.585 | 29.9 (resin) |
| 4 | 0.730 | 0.573 | 1.492 | 57.4 (resin) |
| 5 | −1.340 | | | |

| aspherical third surface |
|---|
| K = −16.561 |
| $A_4 = -2.26060 \times 10^{-1}$ |
| $A_6 = -4.32136 \times 10^{-1}$ |
| (1) $|r_4/r_n| = 0.227$ |
| (2) $f/f_{II} = 0.410$ |
| (3) $|r_p/r_n| = 0.417$ |
| (4) $\bar{n} = 1.531$ |
| (5) $r_2/r_1 = -1.000$ |

EXAMPLE 5

| Surface No. | $f = 1.0$  $F_{NO} = 1:4.0$  $2\omega = 56°$ | | | |
|---|---|---|---|---|
| | r | d | n | v |
| 1 | 1.427 | 0.422 | 1.492 | 57.4 |
| 2 | −0.796 | 0.046 | | |
| 3 | 9.313 | 0.126 | 1.585 | 29.9 (resin) |
| 4 | 0.632 | 0.560 | 1.492 | 57.4 (resin) |
| 5 | −1.446 | | | |

| aspherical second surface |
|---|
| K = −0.064 |
| $A_4 = 5.46435 \times 10^{-1}$ |
| $A_6 = 2.80405 \times 10^{-1}$ |
| (1) $|r_4/r_n| = 0.068$ |
| (2) $f/f_{II} = 0.265$ |
| (3) $|r_p/r_n| = 0.155$ |
| (4) $\bar{n} = 1.523$ |
| (5) $r_2/r_1 = -0.558$ |

EXAMPLE 6

| Surface No. | $f = 1.0$  $F_{NO} = 1:4.0$  $2\omega = 56°$ | | | |
|---|---|---|---|---|
| | r | d | n | v |
| 1 | 1.276 | 0.415 | 1.51633 | 64.1 |
| 2 | −1.276 | 0.017 | | |
| 3 | 3.212 | 0.126 | 1.585 | 29.9 (resin) |
| 4 | 0.730 | 0.600 | 1.51633 | 64.1 |
| 5 | −1.586 | | | |

| aspherical third surface |
|---|
| K = −16.561 |
| $A_4 = -2.26060 \times 10^{-1}$ |
| $A_6 = -4.32136 \times 10^{-1}$ |
| (1) $|r_4/r_n| = 0.227$ |
| (2) $f/f_{II} = 0.398$ |
| (3) $|r_p/r_n| = 0.494$ |
| (4) $\bar{n} = 1.539$ |
| (5) $r_2/r_1 = -1.000$ |

EXAMPLE 7

$f = 1.0 \quad F_{NO} = 1:4.0 \quad 2\omega = 56°$

| Surface No. | r | d | n | ν |
|---|---|---|---|---|
| 1 | 1.427 | 0.422 | 1.492 | 57.4 (resin) |
| 2 | −0.796 | 0.046 | | |
| 3 | 9.313 | 0.126 | 1.69895 | 30.1 |
| 4 | 0.800 | 0.560 | 1.51633 | 64.1 |
| 5 | −1.208 | | | | aspherical second surface $K = -0.070$
$A_4 = 5.46435 \times 10^{-1}$
$A_6 = 4.00000 \times 10^{-1}$
(1) $|r_4/r_n| = 0.086$
(2) $f/f_{II} = 0.297$
(3) $|r_p/r_n| = 0.130$
(4) $\bar{n} = 1.569$
(5) $r_2/r_1 = -0.558$

EXAMPLE 8

$f = 1.0 \quad F_{NO} = 1:4.0 \quad 2\omega = 56°$

| Surface No. | r | d | n | ν |
|---|---|---|---|---|
| 1 | 1.427 | 0.422 | 1.492 | 57.4 (resin) |
| 2 | −0.796 | 0.046 | | |
| 3 | 9.313 | 0.126 | 1.69895 | 30.1 |
| 4 | 0.800 | 0.560 | 1.492 | 57.4 (resin) |
| 5 | −1.042 | | | | aspherical second surface $K = -0.070$
$A_4 = 5.46435 \times 10^{-1}$
$A_6 = 6.00000 \times 10^{-1}$
(1) $|r_4/r_n| = 0.086$
(2) $f/f_{II} = 0.319$
(3) $|r_p/r_n| = 0.112$
(4) $\bar{n} = 1.561$
(5) $r_2/r_1 = -0.558$

EXAMPLE 9

$f = 1.0 \quad F_{NO} = 1:4.0 \quad 2\omega = 56°$

| Surface No. | r | d | n | ν |
|---|---|---|---|---|
| 1 | 1.427 | 0.422 | 1.492 | 57.4 (resin) |
| 2 | −0.796 | 0.046 | | |
| 3 | 9.313 | 0.126 | 1.585 | 29.9 (resin) |
| 4 | 0.632 | 0.560 | 1.51633 | 64.1 |
| 5 | −1.851 | | | | aspherical second surface $K = -0.064$
$A_4 = 5.46435 \times 10^{-1}$
$A_6 = 2.80405 \times 10^{-1}$
(1) $|r_4/r_n| = 0.068$
(2) $f/f_{II} = 0.236$
(3) $|r_p/r_n| = 0.199$
(4) $\bar{n} = 1.531$
(5) $r_2/r_1 = -0.558$

EXAMPLE 10

$f = 1.0 \quad F_{NO} = 1:4.0 \quad 2\omega = 56°$

| Surface No. | r | d | n | ν |
|---|---|---|---|---|
| 1 | 1.901 | 0.340 | 1.51633 | 64.1 |
| 2 | −1.162 | 0.017 | | |
| 3 | 1.675 | 0.531 | 1.492 | 57.4 (resin) |
| 4 | −0.680 | 0.169 | 1.69895 | 30.1 |
| 5 | −1.636 | | | | aspherical third surface $K = 5.138$
$A_4 = -2.17588 \times 10^{-1}$
$A_6 = -2.00000 \times 10^{-1}$
(1) $|r_4/r_n| = 0.406$
(2) $f/f_{II} = 0.403$
(3) $|r_p/r_n| = 0.977$
(4) $\bar{n} = 1.569$
(5) $r_2/r_1 = -0.611$

EXAMPLE 11

$f = 1.0 \quad F_{NO} = 1:4.0 \quad 2\omega = 56°$

| Surface No. | r | d | n | ν |
|---|---|---|---|---|
| 1 | 1.531 | 0.464 | 1.58913 | 61.2 |
| 2 | −0.816 | 0.012 | | |
| 3 | −0.795 | 0.084 | 1.585 | 29.9 (resin) |
| 4 | −1.539 | 0.017 | | |
| 5 | 1.085 | 0.411 | 1.492 | 57.4 (resin) |
| 6 | −1.444 | 0.027 | | |
| 7 | −1.220 | 0.118 | 1.585 | 29.9 (resin) |
| 8 | 8.585 | | | | aspherical fifth surface $K = -0.487$
$A_4 = -3.62572 \times 10^{-2}$
(1) $\bar{n} = 1.563$
(2) $f_4/f = -1.816$

EXAMPLE 12

$f = 1.0 \quad F_{NO} = 1:4.0 \quad 2\omega = 56°$

| Surface No. | r | d | n | ν |
|---|---|---|---|---|
| 1 | 1.239 | 0.528 | 1.51633 | 64.1 |
| 2 | −0.759 | 0.084 | 1.64769 | 33.8 |
| 3 | −1.328 | 0.017 | | |
| 4 | 0.969 | 0.460 | 1.492 | 57.4 (resin) |
| 5 | −1.286 | 0.034 | | |
| 6 | −1.079 | 0.121 | 1.585 | 29.9 (resin) |
| 7 | 4.744 | | | | aspherical third surface $K = -0.946$
$A_4 = 2.30838 \times 10^{-2}$
(1) $\bar{n} = 1.560$
(2) $f_4/f = -1.490$

EXAMPLE 13

$f = 1.0 \quad F_{NO} = 1:4.0 \quad 2\omega = 56°$

| Surface No. | r | d | n | ν |
|---|---|---|---|---|
| 1 | 1.316 | 0.494 | 1.492 | 57.4 (resin) |
| 2 | −0.770 | 0.015 | | |
| 3 | −0.744 | 0.084 | 1.585 | 29.9 (resin) |
| 4 | −1.205 | 0.017 | | |
| 5 | 1.065 | 0.443 | 1.492 | 57.4 (resin) |
| 6 | −1.108 | 0.026 | | |
| 7 | −0.977 | 0.118 | 1.585 | 29.9 (resin) |
| 8 | −37.946 | | | | aspherical first surface $K = 0.215$
$A_4 = 3.72173 \times 10^{-2}$ aspherical fifth surface $K = -0.765$
$A_4 = -8.73876 \times 10^{-2}$
(1) $\bar{n} = 1.539$
(2) $f_4/f = -1.714$

EXAMPLE 14

| Surface No. | f = 1.0 F$_{NO}$ = 1:4.0 2ω = 56° | | | |
|---|---|---|---|---|
| | r | d | n | ν |
| 1 | 1.671 | 0.642 | 1.51633 | 64.1 |
| 2 | −0.675 | 0.084 | 1.64769 | 33.8 |
| 3 | −1.049 | 0.017 | | |
| 4 | 0.888 | 0.574 | 1.492 | 57.4 (resin) |
| 5 | −1.945 | 0.188 | 1.585 | 29.9 (resin) |
| 6 | 1.889 | | | | aspherical fourth surface

K = −1.015
A$_4$ = 9.16712 × 10$^{-2}$
(1) n̄ = 1.560
(2) f$_4$/f = −1.059

EXAMPLE 15

| Surface No. | f = 1.0 F$_{NO}$ = 1:4.0 2ω = 56° | | | |
|---|---|---|---|---|
| | r | d | n | ν |
| 1 | 1.239 | 0.500 | 1.492 | 57.4 (resin) |
| 2 | −0.759 | 0.084 | 1.64769 | 33.8 |
| 3 | −1.328 | 0.017 | | |
| 4 | 0.969 | 0.460 | 1.492 | 57.4 (resin) |
| 5 | −1.286 | 0.034 | | |
| 6 | −1.079 | 1.021 | 1.585 | 29.9 (resin) |
| 7 | 41.319 | | | | aspherical fourth surface

K = −0.946
A$_4$ = 2.30838 × 10$^{-2}$
(1) n̄ = 1.554
(2) f$_4$/f = −1.795

We claim:

1. An ocular system composed of at least three lens elements for constituting, in order from the eye side, at least first and second lens units, at least one of said lens elements being made of resin, at least two of said lens elements being substantially cemented together and at least said lens element closest to the eye comprising glass.

2. The system according to claim 1, wherein said first lens unit has a positive focal length.

3. The system according to claim 2, wherein said second lens unit has a positive focal length.

4. The system according to any one of claims 1 to 3, wherein an aspherical surface is formed in said at least one of said lens elements made of resin.

5. The system according to claim 2, wherein said first lens unit is composed, in order from the eye side, of a positive first lens element and a negative meniscus second lens element, and said second lens unit is composed, in order from the eye side, of a positive third lens element and a negative fourth lens element.

6. The system according to claim 3, wherein said first lens unit is composed of a positive first lens element and said second lens unit is composed of a second lens element and a third lens element, in order from the eye side.

7. The system according to claim 6, wherein said second lens element has a positive focal length.

8. The system according to claim 7, wherein said third lens element has a positive focal length.

9. The system according to claim 7, wherein said third lens element has a negative focal length.

10. The system according to claim 1, wherein the lens element closest to an eye piece is made of glass.

11. The system according to claim 5, wherein said third and fourth lens elements are cemented together.

12. The system according to claim 6, wherein said second and third lens elements are cemented together.

13. The system according to claim 4, wherein the aspherical surface meets the following condition:

$$X = \frac{Cy^2}{1 + \sqrt{1 - (K+1)C^2y^2}} + A_4y^4 + A_6y^6 \ldots$$

where X is an amount of deviation from an apex of the aspherical lens in an axial direction, Y is the amount of deviation from the apex in a vertical direction relative to the axial direction, C is the inverted number of the radius of curvature thereof, K is the conical constant, and A$_4$, A$_6$, . . . are the aspherical surface coefficients.

14. The system according to claim 5, further satisfying the following conditions:

$$\bar{n} < 1.60, \text{ and} \quad (4)$$

$$-4.0 < f_4/f < -0.5 \quad (6)$$

where n̄ is the average value of the refractive indexes of all the lens elements on d-line, f$_4$ is the focal length of the fourth lens element, and f is the focal length of the overall system.

15. The system according to claim 12, further satisfying the following conditions:

$$|r_4/r_n| < 0.47 \quad (1)$$

$$0.10 < f/f_{II} < 0.65 \quad (2)$$

where r$_4$ is the radius of curvature of the bonded surface of the second lens unit, r$_n$ is the radius of curvature of the surface other than the bonded surface of the negative lens element of said second lens unit, f is the focal length of the overall system, and f$_{II}$ is the focal length of the second lens unit.

16. The system according to claim 5, further satisfying the following conditions:

$$|r_p/r_n| < 1.55 \quad (3)$$

$$n < 1.60 \quad (4)$$

where r$_p$ is the radius of curvature other than the bonded surface of the positive lens element of the second lens unit, and r$_n$ is the average value of the refractive indexes of the three lens elements on d-line.

17. The system according to claim 5, further satisfying the following conditions:

$$-1.70 < r_2/r_1 \leqq 0 \quad (5)$$

where r$_1$ and r$_2$ are the radii of curvature of the surfaces, on the eye side and the image side, of the first lens unit.

18. The system according to claim 1, satisfying the following conditions:

| Surface No. | f = 1.0 F$_{NO}$ = 1:4.0 2ω = 56° | | | |
|---|---|---|---|---|
| | r | d | n | ν |
| 1 | 1.901 | 0.340 | 1.51633 | 64.1 |
| 2 | −1.162 | 0.017 | | |
| 3 | 1.675 | 0.531 | 1.492 | 57.4 (resin) |
| 4 | −0.632 | 0.169 | 1.585 | 29.9 (resin) |
| 5 | −2.301 | | | |

-continued aspherical third surface

K = 5.138
$A_4 = -2.17588 \times 10^{-1}$
$A_6 = -3.22044 \times 10^{-1}$
(1) $|r_4/r_n| = 0.275$
(2) $f/f_{II} = 0.385$
(3) $|r_p/r_n| = 0.728$
(4) $\bar{n} = 1.531$
(5) $r_2/r_1 = -0.611$ where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

19. The system according to claim 1, further satisfying the following conditions:

| Surface No. | f = 1.0   $F_{NO}$ = 1:4.0   $2\omega$ = 56° | | | |
|---|---|---|---|---|
| | r | d | n | v |
| 1 | 5.255 | 0.318 | 1.51633 | 64.1 |
| 2 | −1.031 | 0.017 | | |
| 3 | 0.943 | 0.548 | 1.492 | 57.4 (resin) |
| 4 | −0.842 | 0.168 | 1.585 | 29.9 (resin) |
| 5 | 8.573 | | | | aspherical third surface

K = 0.414
$A_4 = 1.06217 \times 10^{-1}$
$A_6 = 1.38306 \times 10^{-1}$
(1) $|r_4/r_n| = 0.098$
(2) $f/f_{II} = 0.380$
(3) $|r_p/r_n| = 0.110$
(4) $\bar{n} = 1.531$
(5) $r_2/r_1 = -0.196$ where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

20. The system according to claim 1, further satisfying the following conditions:

| Surface No. | f = 1.0   $F_{NO}$ = 1:4.0   $2\omega$ = 56° | | | |
|---|---|---|---|---|
| | r | d | n | v |
| 1 | 1.523 | 0.382 | 1.51633 | 64.1 |
| 2 | −1.433 | 0.017 | | |
| 3 | 1.011 | 0.604 | 1.492 | 57.4 (resin) |
| 4 | −0.752 | 0.126 | 1.585 | 29.9 (resin) |
| 5 | 4.216 | | | | aspherical third surface

K = 0.619
$A_4 = -1.05992 \times 10^{-1}$
$A_6 = -3.44424 \times 10^{-1}$
(1) $|r_4/r_n| = 0.178$
(2) $f/f_{II} = 0.279$
(3) $|r_p/r_n| = 0.240$
(4) $\bar{n} = 1.531$
(5) $r_2/r_1 = -0.941$ where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

21. The system according to claim 1, further satisfying the following conditions:

| Surface No. | f = 1.0   $F_{NO}$ = 1:4.0   $2\omega$ = 56° | | | |
|---|---|---|---|---|
| | r | d | n | v |
| 1 | 1.276 | 0.415 | 1.51633 | 64.1 |
| 2 | −1.276 | 0.017 | | |
| 3 | 3.212 | 0.126 | 1.585 | 29.9 (resin) |
| 4 | 0.730 | 0.573 | 1.492 | 57.4 (resin) |
| 5 | −1.340 | | | | aspherical third surface

K = −16.561
$A_4 = -2.26060 \times 10^{-1}$
$A_6 = -4.32136 \times 10^{-1}$
(1) $|r_4/r_n| = 0.227$
(2) $f/f_{II} = 0.410$
(3) $|r_p/r_n| = 0.417$
(4) $\bar{n} = 1.531$
(5) $r_2/r_1 = -1.000$ wherein f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

22. The system according to claim 1, further satisfying the following conditions:

| Surface No. | f = 1.0   $F_{NO}$ = 1:4.0   $2\omega$ = 56° | | | |
|---|---|---|---|---|
| | r | d | n | v |
| 1 | 1.427 | 0.422 | 1.492 | 57.4 |
| 2 | −0.796 | 0.046 | | |
| 3 | 9.313 | 0.126 | 1.585 | 29.9 (resin) |
| 4 | 0.632 | 0.560 | 1.492 | 57.4 (resin) |
| 5 | −1.446 | | | | aspherical second surface

K = −0.064
$A_4 = 5.46435 \times 10^{-1}$
$A_6 = 2.80405 \times 10^{-1}$
(1) $|r_4/r_n| = 0.068$
(2) $f/f_{II} = 0.265$
(3) $|r_p/r_n| = 0.155$ -continued (4) $\bar{n} = 1.523$
(5) $r_2/r_1 = -0.558$ where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

23. The system according to claim 1, further satisfying the following conditions:

| | $f = 1.0$ | $F_{NO} = 1:4.0$ | $2\omega = 56°$ | |
|---|---|---|---|---|
| Surface No. | r | d | n | v |
| 1 | 1.276 | 0.415 | 1.51633 | 64.1 |
| 2 | −1.276 | 0.017 | | |
| 3 | 3.212 | 0.126 | 1.585 | 29.9 (resin) |
| 4 | 0.730 | 0.600 | 1.51633 | 64.1 |
| 5 | −1.586 | | | |
| aspherical third surface | | | | |

$K = -16.561$
$A_4 = -2.26060 \times 10^{-1}$
$A_6 = -4.32136 \times 10^{-1}$
(1) $|r_4/r_n| = 0.227$
(2) $f/f_{II} = 0.398$
(3) $|r_p/r_n| = 0.494$
(4) $\bar{n} = 1.539$
(5) $r_2/r_1 = -1.000$ where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

24. The system according to claim 1, further satisfying the following conditions:

| | $f = 1.0$ | $F_{NO} = 1:4.0$ | $2\omega = 56°$ | |
|---|---|---|---|---|
| Surface No. | r | d | n | v |
| 1 | 1.427 | 0.422 | 1.492 | 57.4 (resin) |
| 2 | −0.796 | 0.046 | | |
| 3 | 9.313 | 0.126 | 1.69895 | 30.1 |
| 4 | 0.800 | 0.560 | 1.51633 | 64.1 |
| 5 | −1.208 | | | |
| aspherical second surface | | | | |

$K = -0.070$
$A_4 = -5.46435 \times 10^{-1}$
$A_6 = -4.00000 \times 10^{-1}$
(1) $|r_4/r_n| = 0.086$
(2) $f/f_{II} = 0.297$
(3) $|r_p/r_n| = 0.130$
(4) $\bar{n} = 1.569$
(5) $r_2/r_1 = -0.558$ where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

25. The system according to claim 1, further satisfying the following conditions:

| | $f = 1.0$ | $F_{NO} = 1:4.0$ | $2\omega = 56°$ | |
|---|---|---|---|---|
| Surface No. | r | d | n | v |
| 1 | 1.427 | 0.422 | 1.492 | 57.4 (resin) |
| 2 | −0.796 | 0.046 | | |
| 3 | 9.313 | 0.126 | 1.69895 | 30.1 |
| 4 | 0.800 | 0.560 | 1.492 | 57.4 (resin) |
| 5 | −1.042 | | | |
| aspherical second surface | | | | |

$K = -0.070$
$A_4 = -5.46435 \times 10^{-1}$
$A_6 = -6.00000 \times 10^{-1}$
(1) $|r_4/r_n| = 0.086$
(2) $f/f_{II} = 0.319$
(3) $|r_p/r_n| = 0.112$
(4) $\bar{n} = 1.561$
(5) $r_2/r_1 = -0.558$ where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

26. The system according to claim 1, further satisfying the following conditions:

| | $f = 1.0$ | $F_{NO} = 1:4.0$ | $2\omega = 56°$ | |
|---|---|---|---|---|
| Surface No. | r | d | n | v |
| 1 | 1.427 | 0.422 | 1.492 | 57.4 (resin) |
| 2 | −0.796 | 0.046 | | |
| 3 | 9.313 | 0.126 | 1.585 | 29.9 (resin) |
| 4 | 0.632 | 0.560 | 1.51633 | 64.1 |
| 5 | −1.851 | | | |
| aspherical second surface | | | | |

$K = -0.064$
$A_4 = -5.46435 \times 10^{-1}$
$A_6 = -2.80405 \times 10^{-1}$
(1) $|r_4/r_n| = 0.068$
(2) $f/f_{II} = 0.236$
(3) $|r_p/r_n| = 0.199$
(4) $\bar{n} = 1.531$
(5) $r_2/r_1 = -0.558$ where f is the overall focal length, $F_{no}$ is the F-number, $2\omega$ is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

27. The system according to claim 1, further satisfying the following conditions:

| Surface No. | r | d | n | v |
|---|---|---|---|---|
| \multicolumn{5}{c}{f = 1.0  F$_{NO}$ = 1:4.0  2ω = 56°} | | | | |
| 1 | 1.901 | 0.340 | 1.51633 | 64.1 |
| 2 | −1.162 | 0.017 | | |
| 3 | 1.675 | 0.531 | 1.492 | 57.4 (resin) |
| 4 | 0.680 | 0.169 | 1.69895 | 30.1 |
| 5 | −1.636 | | | | aspherical third surface

K = 5.138
$A_4$ = −2.17588 × 10$^{-1}$
$A_6$ = −2.00000 × 10$^{-1}$
(1) $|r_4/r_n|$ = 0.406
(2) $f/f_{II}$ = 0.403
(3) $|r_p/r_n|$ = 0.977
(4) $\bar{n}$ = 1.569
(5) $r_2/r_1$ = −0.611 where f is the overall focal length, $F_{no}$ is the F-number, 2ω is the viewing angle, r is the radius of curvature of each lens surface, d is the lens thickness or the interval between the adjacent lenses, n is the refractive index of each lens at d-line, v is the Abbe number, $f_{II}$ is the focal length of the second lens unit, $\bar{n}$ is the average value of the refractive indexes of all of the lens elements on d-line, K is the conical constant, $A_4$ and $A_6$ are the aspherical surface coefficients and $r_p$ and $r_n$ are the radii of curvature of surfaces other than the bonded surface of the positive lens element and the negative lens element, respectively, of the second lens unit.

28. An ocular system composed of at least three lens elements for constituting, in order from the eye side, at least first and second lens units, all of said lens elements being made of resin.

29. The system according to claim 28, wherein said first lens unit has a positive focal length.

30. The system according to claim 28, wherein said second lens unit has a positive focal length.

31. The system according to any one of claims 28 to 30, wherein an aspherical surface is formed in said at least one of said lens elements made of resin.

32. The system according to claim 29, wherein said first lens unit is composed, in order from the eye side, of a positive first lens element and a negative meniscus second lens element, and said second lens unit is composed, in order from the eye side, of a positive third lens element and a negative fourth lens element.

33. The system according to claim 30, wherein said first lens unit is composed of a positive first lens element and said second lens unit is composed of a second lens element and a third lens element, in order from the eye side.

34. The system according to claim 31, wherein the aspherical surface meets the following condition:

$$X = \frac{Cy^2}{1 + \sqrt{1 - (K+1)C^2y^2}} + A_4 y^4 + A_6 y^6 + \ldots$$

where X is an amount of deviation from an apex of the aspherical lens in an axial direction, y is the amount of deviation from the apex in a vertical direction relative to the axial direction, C is the inverted number of the radius of curvature thereof, K is the conical constant, and $A_4, A_6, \ldots$ are the aspherical surface coefficients.

35. An ocular system composed, in order from the eye side, of a positive first lens element, a negative meniscus second lens element, a positive third lens element and a negative fourth lens element, at least third and fourth lens elements are made of resinous optical material.

36. The system according to claim 35, wherein an aspherical surface is formed in said at least one of said lens elements made of resin.

37. The system according to claim 36, wherein the aspherical surface meets the following condition:

$$X = \frac{Cy^2}{1 + \sqrt{1 - (K+1)C^2y^2}} + A_4 y^4 + A_6 y^6 + \ldots$$

where X is an amount of deviation from an apex of the aspherical lens in an axial direction, y is the amount of deviation from the apex in a vertical direction relative to the axial direction, C is the inverted number of the radius of curvature thereof, K is the conical constant, and $A_4, A_6, \ldots$ are the aspherical surface coefficients.

38. The system according to claim 35, further satisfying the following conditions:

| Surface No. | r | d | n | v |
|---|---|---|---|---|
| \multicolumn{5}{c}{f = 1.0  F$_{NO}$ = 1:4.0  2ω = 56°} | | | | |
| 1 | 1.531 | 0.464 | 1.58913 | 61.2 |
| 2 | −0.816 | 0.012 | | |
| 3 | −0.795 | 0.084 | 1.585 | 29.9 (resin) |
| 4 | −1.539 | 0.017 | | |
| 5 | 1.085 | 0.411 | 1.492 | 57.4 (resin) |
| 6 | −1.444 | 0.027 | | |
| 7 | −1.220 | 0.118 | 1.585 | 29.9 (resin) |
| 8 | 8.585 | | | | aspherical fifth surface

K = −0.487
$A_4$ = −3.62572 × 10$^{-2}$
(1) $\bar{n}$ = 1.563
(2) $f_4/f$ = −1.816 where f is the overall focal length, $F_{NO}$ is the F-number, 2ω is the viewing angle, r is the radius of curvature of each lens surface, d is the lens thickness or the interval between the adjacent lenses, n is the refractive index of each lens at d-line, v is the Abbe number, $\bar{n}$ is the average value of the refractive indexes of all of the lens elements on d-line, K is the conical constant, $A_4$ is the aspherical surface coefficient and $f_4$ is the focal length of the fourth lens element.

39. The system according to claim 35, further satisfying the following conditions:

| Surface No. | r | d | n | v |
|---|---|---|---|---|
| \multicolumn{5}{c}{f = 1.0  F$_{NO}$ = 1:4.0  2ω = 56°} | | | | |
| 1 | 1.239 | 0.528 | 1.51633 | 64.1 |
| 2 | −0.759 | 0.084 | 1.64769 | 33.8 |
| 3 | −1.328 | 0.017 | | |
| 4 | −0.969 | 0.460 | 1.492 | 57.4 (resin) |
| 5 | −1.286 | 0.034 | | |
| 6 | −1.079 | 0.121 | 1.585 | 29.9 (resin) |
| 7 | 4.744 | | | |

-continued

| aspherical third surface |
|---|
| K = −0.946 |
| $A_4 = 2.30838 \times 10^{-2}$ |
| (1) $\bar{n} = 1.560$ |
| (2) $f_4/f = -1.490$ | where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, and v is the Abbe number, $\bar{n}$ is the average value of the refractive indexes of all of the lens elements on d-line, K is the conical constant, $A_4$ is the aspherical surface coefficient and $f_4$ is the focal length of the fourth lens element.

40. The system according to claim 35, further satisfying the following conditions:

| | f = 1.0 | $F_{NO}$ = 1:4.0 | $2\omega$ = 56° | |
|---|---|---|---|---|
| Surface No. | r | d | n | v |
| 1 | 1.316 | 0.494 | 1.492 | 57.4 (resin) |
| 2 | −0.770 | 0.015 | | |
| 3 | −0.744 | 0.084 | 1.585 | 29.9 (resin) |
| 4 | −1.205 | 0.017 | | |
| 5 | 1.065 | 0.443 | 1.492 | 57.4 (resin) |
| 6 | −1.108 | 0.026 | | |
| 7 | −0.977 | 0.118 | 1.585 | 29.9 (resin) |
| 8 | −37.946 | | | |

| aspherical first surface |
|---|
| K = 0.215 |
| $A_4 = 3.72173 \times 10^{-2}$ |

| aspherical fifth surface |
|---|
| K = −0.765 |
| $A_4 = -8.73876 \times 10^{-2}$ |
| (1) $\bar{n} = 1.539$ |
| (2) $f_4/f = -1.714$ | where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, and v is the Abbe number, $\bar{n}$ is the average value of the refractive indexes of all of the lens elements on d-line, K is the conical constant, $A_4$ is the aspherical surface coefficient, and $f_4$ is the focal length of the fourth lens element.

41. The system according to claim 35, further satisfying the following conditions:

| | f = 1.0 | $F_{NO}$ = 1:4.0 | $2\omega$ = 56° | |
|---|---|---|---|---|
| Surface No. | r | d | n | v |
| 1 | 1.671 | 0.642 | 1.51633 | 64.1 |
| 2 | −0.675 | 0.084 | 1.64769 | 33.8 |
| 3 | −1.049 | 0.017 | | |
| 4 | 0.888 | 0.574 | 1.492 | 57.4 (resin) |
| 5 | −1.945 | 0.188 | 1.585 | 29.9 (resin) |
| 6 | −1.889 | | | |

| aspherical fourth surface |
|---|
| K = −1.015 |
| $A_4 = 9.16712 \times 10^{-2}$ |
| (1) $\bar{n} = 1.560$ |
| (2) $f_4/f = -1.059$ | where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $\bar{n}$ is the average value of the refractive indexes of all of the lens elements on d-line, K is the conical constant, $A_4$ is the aspherical surface coefficient and $f_4$ is the focal length of the fourth lens element.

42. The system according to claim 35, further satisfying the following conditions:

| | f = 1.0 | $F_{NO}$ = 1:4.0 | $2\omega$ = 56° | |
|---|---|---|---|---|
| Surface No. | r | d | n | v |
| 1 | 1.239 | 0.500 | 1.492 | 57.4 (resin) |
| 2 | −0.759 | 0.084 | 1.64769 | 33.8 |
| 3 | −1.328 | 0.017 | | |
| 4 | 0.969 | 0.460 | 1.492 | 57.4 (resin) |
| 5 | −1.286 | 0.034 | | |
| 6 | −1.079 | 1.021 | 1.585 | 29.9 (resin) |
| 7 | 41.319 | | | |

| aspherical fourth surface |
|---|
| K = −0.946 |
| $A_4 = 2.30838 \times 10^{-2}$ |
| (1) $\bar{n} = 1.554$ |
| (2) $f_4/f = -1.795$ | where f is the overall focal length, $F_{NO}$ is the F-number, $2\omega$ is the viewing angle, r is the radius of curvature of each lens surface, d is the lens thickness or the interval between the adjacent lenses, n is the refractive index of each lens at d-line, v is the Abbe number, $\bar{n}$ is the average value of the refractive indexes of all of the lens elements on d-line, K is the conical constant, $A_4$ is the aspherical surface coefficient and $f_4$ is the focal length of the fourth lens element.

* * * * *